United States Patent
Durand et al.

(10) Patent No.: US 8,312,555 B2
(45) Date of Patent: Nov. 13, 2012

(54) DEVICE, SYSTEM AND METHOD FOR SERVICE DELIVERY WITH ANTI-EMULATION MECHANISM

(75) Inventors: Alain Durand, Rennes (FR); Eric Diehl, Liffre (FR); Olivier Heen, Domloup (FR)

(73) Assignee: Thomson Licensing, Boulogne-Billancourt (FR)

( * ) Notice: Subject to any disclaimer, the term of this patent is extended or adjusted under 35 U.S.C. 154(b) by 590 days.

(21) Appl. No.: 12/227,037

(22) PCT Filed: May 4, 2007

(86) PCT No.: PCT/EP2007/054370
§ 371 (c)(1), (2), (4) Date: Nov. 5, 2008

(87) PCT Pub. No.: WO2007/128794
PCT Pub. Date: Nov. 15, 2007

(65) Prior Publication Data
US 2009/0240938 A1 Sep. 24, 2009

(30) Foreign Application Priority Data
May 9, 2006 (EP) .................................. 06290750

(51) Int. Cl.
*G06F 7/04* (2006.01)
*G06F 11/00* (2006.01)
*G06F 17/30* (2006.01)

(52) U.S. Cl. .................. 726/29; 726/4; 726/22; 726/34; 713/168; 713/170

(58) Field of Classification Search .................. 713/168, 713/170; 726/4, 22, 29, 34
See application file for complete search history.

(56) References Cited

U.S. PATENT DOCUMENTS

| | | | | |
|---|---|---|---|---|
| 4,785,416 | A * | 11/1988 | Stringer | 703/23 |
| 7,627,896 | B2 * | 12/2009 | Herrmann | 726/14 |
| 2002/0007456 | A1 * | 1/2002 | Peinado et al. | 713/164 |
| 2003/0014630 | A1 | 1/2003 | Spencer et al. | |
| 2003/0233584 | A1 * | 12/2003 | Douceur | 713/202 |
| 2004/0030912 | A1 * | 2/2004 | Merkle et al. | 713/200 |
| 2004/0039946 | A1 | 2/2004 | Smith et al. | |
| 2004/0133794 | A1 * | 7/2004 | Kocher et al. | 713/193 |
| 2004/0230540 | A1 | 11/2004 | Crane et al. | |

(Continued)

FOREIGN PATENT DOCUMENTS
EP 1376301 1/2004

OTHER PUBLICATIONS
Search Report Dated Jun. 18, 2007.

*Primary Examiner* — Michael Simitoski
(74) *Attorney, Agent, or Firm* — Tutunjian & Bitetto, P.C.

(57) ABSTRACT

A method for service delivery to a client, in which the client selects a service, and establishes a connection with a system server to which it sends an identity associated with the client and an identifier of the service. The system server verifies that the client is authorized to access to the service and that the client is non-emulated. If this is verified, the service is provided to the client. In a preferred embodiment, the service is scrambled content and the system server provides a descrambling key to the client, and instructs a content server to provide the scrambled content to the client. Also claimed are a device, a system, and a system server.

9 Claims, 2 Drawing Sheets

U.S. PATENT DOCUMENTS

| | | |
|---|---|---|
| 2005/0076209 A1 | 4/2005 | Proudler |
| 2005/0125357 A1* | 6/2005 | Saadat et al. .................... 705/57 |
| 2005/0246767 A1* | 11/2005 | Fazal et al. ...................... 726/11 |
| 2005/0273608 A1* | 12/2005 | Kamperman ................. 713/169 |
| 2005/0278775 A1* | 12/2005 | Ross ................................ 726/2 |
| 2006/0070129 A1* | 3/2006 | Sobel et al. ..................... 726/23 |
| 2006/0130139 A1* | 6/2006 | Sobel et al. ..................... 726/22 |
| 2006/0154631 A1* | 7/2006 | Nakano et al. ............. 455/181.1 |
| 2006/0179476 A1* | 8/2006 | Challener et al. ................. 726/4 |
| 2007/0033419 A1* | 2/2007 | Kocher et al. ................. 713/193 |

* cited by examiner

DEVICE, SYSTEM AND METHOD FOR SERVICE DELIVERY WITH ANTI-EMULATION MECHANISM

This application claims the benefit, under 35 U.S.C. §365 of International Application PCT/EP2007/054370, filed May 4, 2007, which was published in accordance with PCT Article 21(2) on Nov. 15, 2007 in English and which claims the benefit of European patent application No. 06290750.6, filed on May 9, 2006.

FIELD OF THE INVENTION

The invention is generally directed to networks, and more specifically to secure service delivery in client-server networks.

BACKGROUND OF THE INVENTION

It is very common in networks to have a server provide services to a client. The client, commonly with a user, demands a service from the server, which, usually after verification that the client has the right to access the service, provides the service to the client. Examples of such services are video-on-demand, printing of documents, and unlocking of locked doors.

Unfortunately, there are people, so called "hackers" or "pirates" who try to obtain access to such services without having the right to do so. To this end, they use various techniques to overcome the security solutions in the networks.

One of the solutions that attempt to thwart the efforts of the hackers is mutual authentication, i.e. the client authenticates the server to ensure that it is an authentic server and vice versa. The authentication may be performed using the presentation of a valid or signed identity, the presentation of a username and associated password, or protocols involving symmetric or asymmetric cryptography.

Another solution is to use closed platforms that are difficult to reverse engineer to recover their secrets or to modify their behaviour. This solution, usually used together with other solutions such as authentication, is for example used in game stations (e.g. PlayStation and Xbox), set-top boxes in pay-TV systems, triple-play modems (e.g. Freebox and Livebox) or mobile phones. This is, naturally, quite different from personal computers (PCs) for which it may be argued that their strength comes from the diversity of architectures.

While it is difficult to emulate a closed platform sufficiently to impersonate it towards the server, it has been shown that this is not impossible. The standard solution to this problem is revocation. When the system authority becomes aware that a client has been cracked, the client is put on a revocation list. During authentication, the server first verifies if the client is on the revocation list and, if so, denies service. Within the context of the present application, "emulate a platform" means that the emulating platform purports to use certain hardware, to use a certain operating system, to run certain applications, or a combination thereof. Furthermore, to verify that a client is non-emulated means to verify that it uses certain hardware, uses a certain operating system, runs certain applications, or a combination thereof.

For the revocation to be efficient, the system authority needs to be aware that a device has been cracked. This may take a long time during which the hacker may continue to enjoy the services or, even worse, let others know how to emulate the device so that the services may be used by many people.

It can thus be appreciated that there is a need for a solution that improves upon the current security solutions, making it more difficult for hackers to emulate client devices.

The present invention provides such a solution.

SUMMARY OF THE INVENTION

In a first aspect, the invention is directed to a method for service delivery to a device. An identity associated with the device and an identifier of a service desired by the device are received. The method then verifies that the identity is authorized to access to the desired service and that the device is not emulated. The service is then provided to the device.

In a preferred embodiment, the service is the delivery of scrambled content and the service is provided by providing at least one key necessary for descrambling the content and providing the scrambled content.

In a second aspect, the invention is directed to a system adapted for service delivery to a device. A system server is adapted to receive an identity associated with the device and an identifier of a service desired by the device, to verify that the identity is authorized to access to the desired service and that the device is not emulated. A service server is adapted to provide the service to the client, and the system server is further adapted to instruct the service server to provide the service to the client.

In a preferred embodiment, the service server is a content server adapted to provide scrambled content to the client and the system server is further adapted to provide to the client at least one key necessary for descrambling the content.

It is advantageous that the system further comprises a content pre-processor adapted to prepare content for delivery and to provide scrambled content to the content server and at least one corresponding descrambling key to the system server.

In a third aspect, the invention is directed to a client comprising a processor adapted to send an identity associated with the client and an identifier of a desired service via a communication unit to a system server, to perform at least one action to prove to the system server that the client is not emulated, and to receive the desired service via the communication unit.

In a fourth aspect, the invention is directed to a system server adapted for service delivery to a device. The system server comprises a processor adapted to receive an identity associated with the device and an identifier of a service desired by the device, to verify that the identity is authorized access to the desired service and that the device is not emulated, and to instruct a service server to provide the service to the device.

BRIEF DESCRIPTION OF THE DRAWINGS

Preferred features of the present invention will now be described, by way of example, with reference to the accompanying drawings, in which.

DETAILED DESCRIPTION OF PREFERRED EMBODIMENTS

While the description hereinafter is directed to delivery of video-on-demand, it should be understood that this is merely an example and that other services may be delivered to a client.

Figure 1:
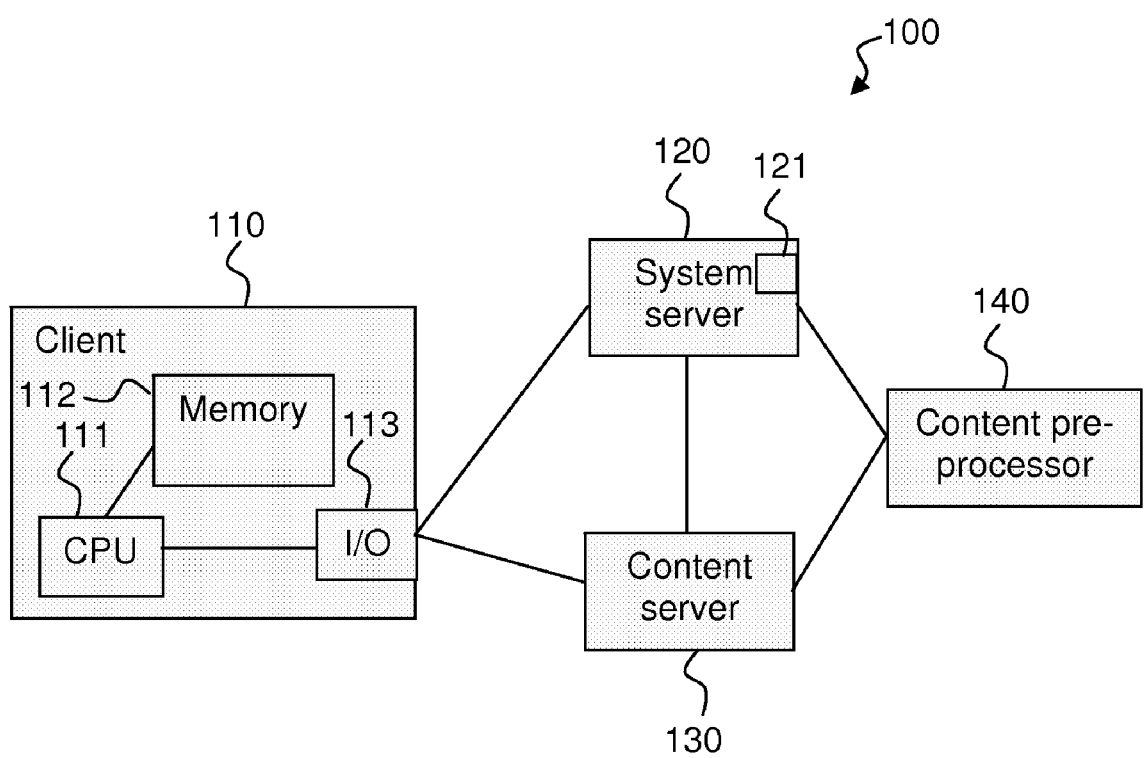
FIG. 1 illustrates a system according to a preferred embodiment of the invention.

FIG. 1 illustrates a network 100 in which the invention is used. A client 110 is adapted to interact with a system server 120 and a content server 130. In addition, there is a content pre-processor 140 adapted to interact with the system server 120 and the content server 130. Although only illustrated for the client 110 (except for a processor 121 of the system server 120), each device 110, 120, 130, 140 is equipped with at least a processor (CPU) 111, a memory 112 and a communication interface (I/O) 113. It should be noted that any combination of the system server 120, the content server 130 and/or the content pre-processor 140 may be co-located or indeed embodied within one physical device. Furthermore, each device may be physically embodied in a plurality of physical devices.

Figure 2:
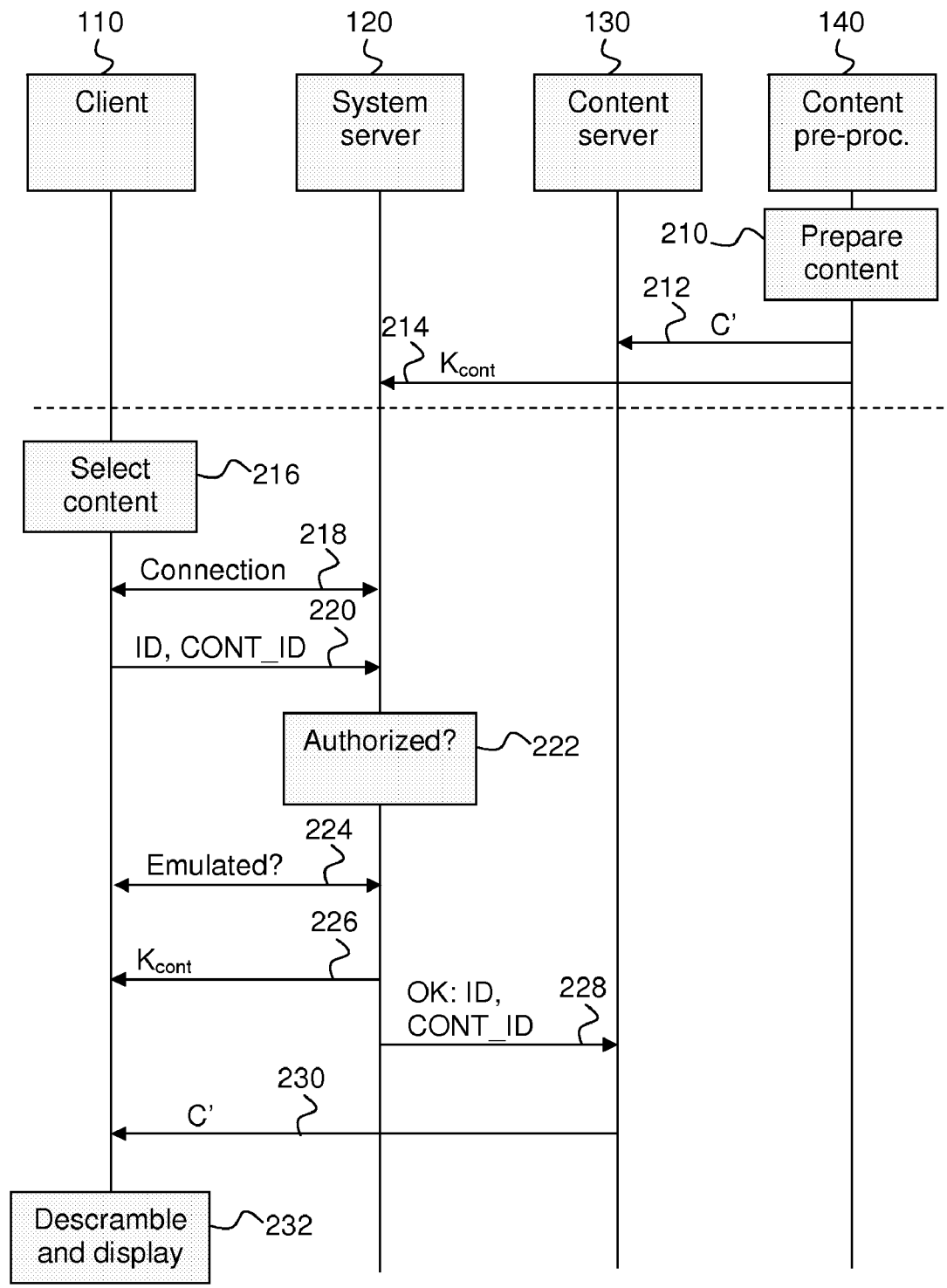
FIG. 2 illustrates a method of service delivery according to a preferred embodiment of the invention.

FIG. 2 illustrates a preferred embodiment of the method of service delivery according to the invention. In a first phase, the content pre-processor 140 prepares the content 210, preferably by scrambling the content C using one content scrambling key $K_{cont}$ per content unit (such as a song or a film scene). The content pre-processor 140 sends 212 the content scrambling key or keys to the system server 120 and also sends 214 the scrambled content C' to the content server 130. The content preparation may be performed at any time before content delivery, even when the client 110 contacts the system server 120 to access the content C.

The content preparation may also be renewed one or more times over time. In a preferred embodiment, AES-128—i.e. Advanced Encryption Standard encryption with a 128-bit key—is used for scrambling the content.

The separation between the first phase and the second phase is indicated by a dotted line in FIG. 2.

The second phase begins when the user selects one or more items content 216; in the description hereinafter, one item only will be used for clarity. The client 110 contacts the system server 120 and they establish 218 a secure connection, preferably a Secure Socket Layer (SSL) connection, as is well known in the art. At this step, client and server agree on a shared tunnel key $K_{SSL}$. SSL, in its standard usage, allows the client to authenticate the server. If the client has a certificate, SSL can be used as well for the client authentication. However, in the preferred embodiment of this invention, the client has no certificate. The client 110 then transfers 220 to the system server 120 an identity (ID), for example the client identity or the user identity, and at least one content identifier (CONT_ID) over the connection. In a preferred embodiment of the invention, the identity is sent encrypted with key $K_{SSL}$. Upon reception of the identity (ID) and the identifier (CONT_ID), the system server 120 verifies 222 that the user or the client is authorized to access the selected content. It can therefore be appreciated that client and server have mutually authenticated at this step.

If the verification 222 is successful, the system server 120 then verifies 224 that the client 110 runs on the proper platform; in other words, that it is not emulated. Proper platform means that it uses the expected processor, operates the expected Operating System and runs the expected applications. This may for example be done by transferring an application to the client 110, requiring the client 110 to execute the application in critical mode—i.e. without interruption—and then return to the system server 120 the number of cycles necessary for the computation. As it is possible for the system server 120 to verify that the number of cycles is correct, this may thus at the very least greatly increase the probability that the client 110 is not emulated. An alternate possibility is for send a cryptographic challenge to the client 110. The cryptographic challenge requires a predetermined number of iterations to solve and once the client 110 has solved the cryptographic challenge, it returns the number of iterations and, possibly, the result. While an emulated client may solve the cryptographic challenge, it is difficult to emulate a client that solves it in the expected number of iterations. An example of a cryptographic challenge is a key search. The client for example receives an unencrypted text and an encrypted version of the text and then searches for the encryption key following a determined algorithm. As such, the alternate possibility also at the very least greatly increases the probability that the client 110 is not emulated.

If the verification 222 or the verification 224 fails, then the system server 120 interrupts the transaction with the client 110.

If the client 110 passes the "non-emulation" verification 224, the system server 120 sends 226 the content scrambling key $K_{cont}$ to the client 110, and informs 228 the content server 130 that the content may be delivered to the client 110. In a preferred embodiment, content scrambling key $K_{cont}$ is sent encrypted with key $K_{SSL}$. The content server 130 then delivers 230 the scrambled content C' to the client 110, which may descramble the content, using the content scrambling key $K_{cont}$ received from the system server 120, and make it accessible 232 to a user. It can be appreciated that the platform being closed, $K_{cont}$ is normally never available to the end user that may thus not access to clear digital content.

It can thus be appreciated that the present invention provides a system and a method that increases the likelihood that a service is delivered to a real client, and not to an emulated client.

It will be understood that the present invention has been described purely by way of example, and modifications of detail can be made without departing from the scope of the invention.

It will also be understood that it is possible for one physical device to accommodate the functions of more than one device described hereinbefore.

Each feature disclosed in the description and (where appropriate) the claims and drawings may be provided independently or in any appropriate combination. Features described as being implemented in hardware may also be implemented in software, and vice versa. Connections may, where applicable, be implemented as wireless connections or wired, not necessarily direct or dedicated, connections.

Reference numerals appearing in the claims are by way of illustration only and shall have no limiting effect on the scope of the claims.

The invention claimed is:

1. A method for service delivery to a device, the method comprising the steps of:
   receiving an identity associated with and from the device;
   receiving an identifier of a service desired by the device;
   verifying that the identity is authorized to access to the desired service;
   verifying that the device is not emulated by:
   sending an application to the device;
   requiring the device to execute the application in critical mode;
   receiving a response from the device, the response comprising the number of cycles necessary for the computation; and
   verifying that the received number of cycles corresponds to an expected number of cycles; and
   providing the service to the device.

2. The method of claim 1, wherein the service is delivery of scrambled content and the step of providing comprises the steps of:

providing at least one key necessary for descrambling the content; and providing the scrambled content.

3. A method for service delivery to a device, the method comprising the steps of:

receiving an identity associated with and from the device;

receiving an identifier of a service desired by the device;

verifying that the identity is authorized to access to the desired service;

verifying that the device is not emulated by:

sending a cryptographic challenge to the device, the cryptographic challenge requiring a number of iterations to solve;

receiving from the device the number of iterations required by the device to solve the cryptographic challenge; and verifying that the received number of iterations corresponds to an expected number of iterations.

4. The method of claim 3, wherein the cryptographic challenge is a key search.

5. The method of claim 3, wherein the service is delivery of scrambled content and the step of providing comprises the steps of:

providing at least one key necessary for descrambling the content; and providing the scrambled content.

6. A device comprising a processor configured to:

send an identity associated with the device and an identifier of a desired service via a communication unit to a system server;

receive an application to the device from the system server;

execute the application in a critical mode;

send a response to the system server, the response comprising a number of cycles necessary for the execution of the application; and receive, via the communication unit, the desired service.

7. A system server configured for service delivery to a device, the system server comprising a processor configured to:

receive an identity associated with the device;

receive an identifier of a service desired by the device;

verify that the identity is authorized to access to the desired service; and verify that the device is not emulated by;

sending an application to the device;

requiring the device to execute the application in critical mode;

receiving a response from the device, the response comprising the number of cycles necessary for the computation; and verifying that the received number of cycles corresponds to an expected number of cycles; and instruct a service server to provide the service to the device.

8. A device comprising a processor configured to:

send an identity associated with the device and an identifier of a desired service via a communication unit to a system server;

receive a cryptographic challenge from the system server, the cryptographic challenge requiring a number of iterations to solve;

solve the cryptographic challenge;

send to the system server the number of iterations required by the device to solve the cryptographic challenge; and receive, via the communication unit, the desired service.

9. A system server configured for service delivery to a device, the system server comprising a processor configured to:

receive an identity associated with the device;

receive an identifier of a service desired by the device;

verify that the identity is authorized to access to the desired service; and verify that the device is not emulated by:

sending a cryptographic challenge to the device, the cryptographic challenge requiring a number of iterations to solve;

receiving from the device the number of iterations required by the device to solve the cryptographic challenge; and verifying that the received number of iterations corresponds to an expected number of iterations; and instruct a service server to provide the service to the device.

* * * * *